Patented Mar. 22, 1938

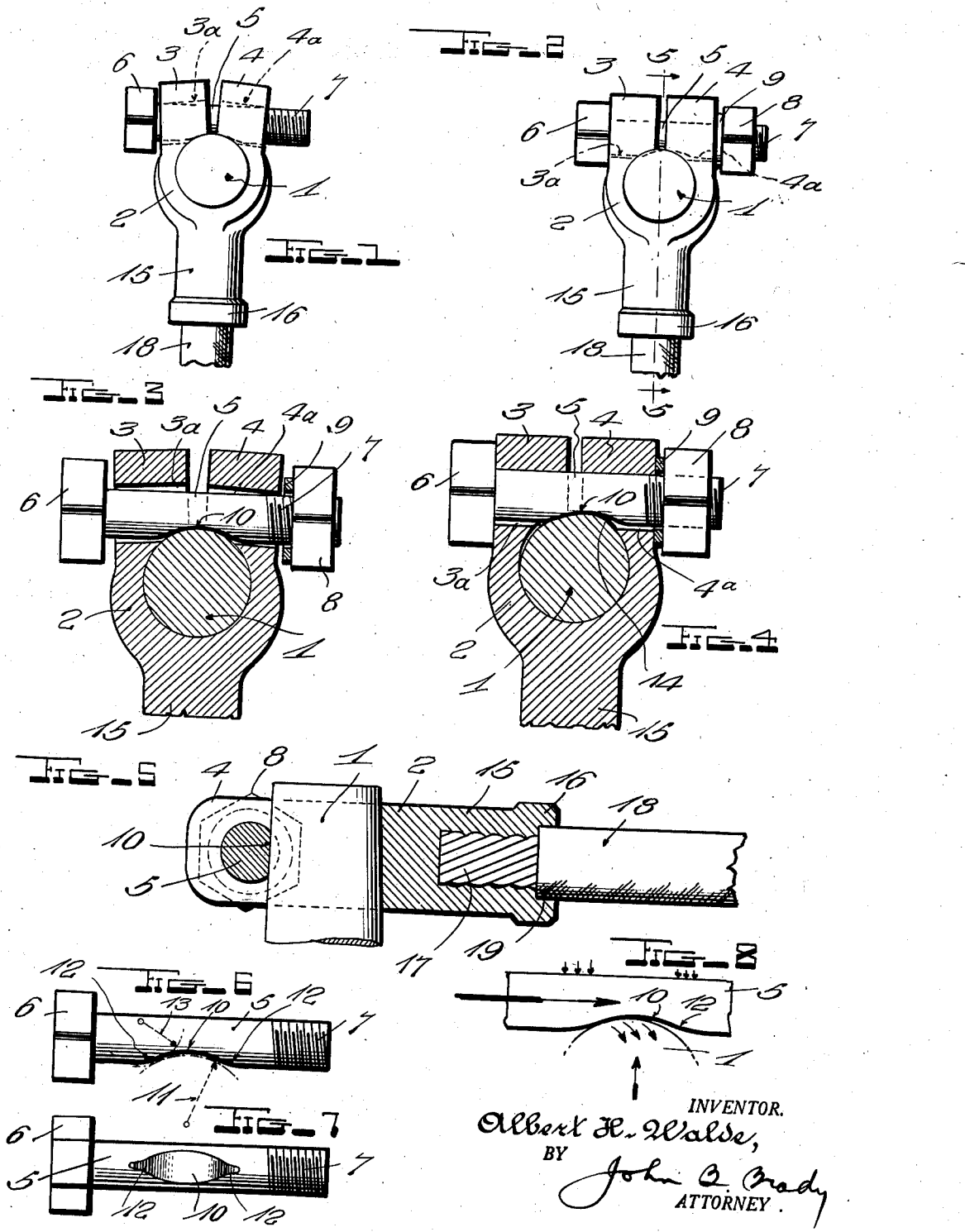

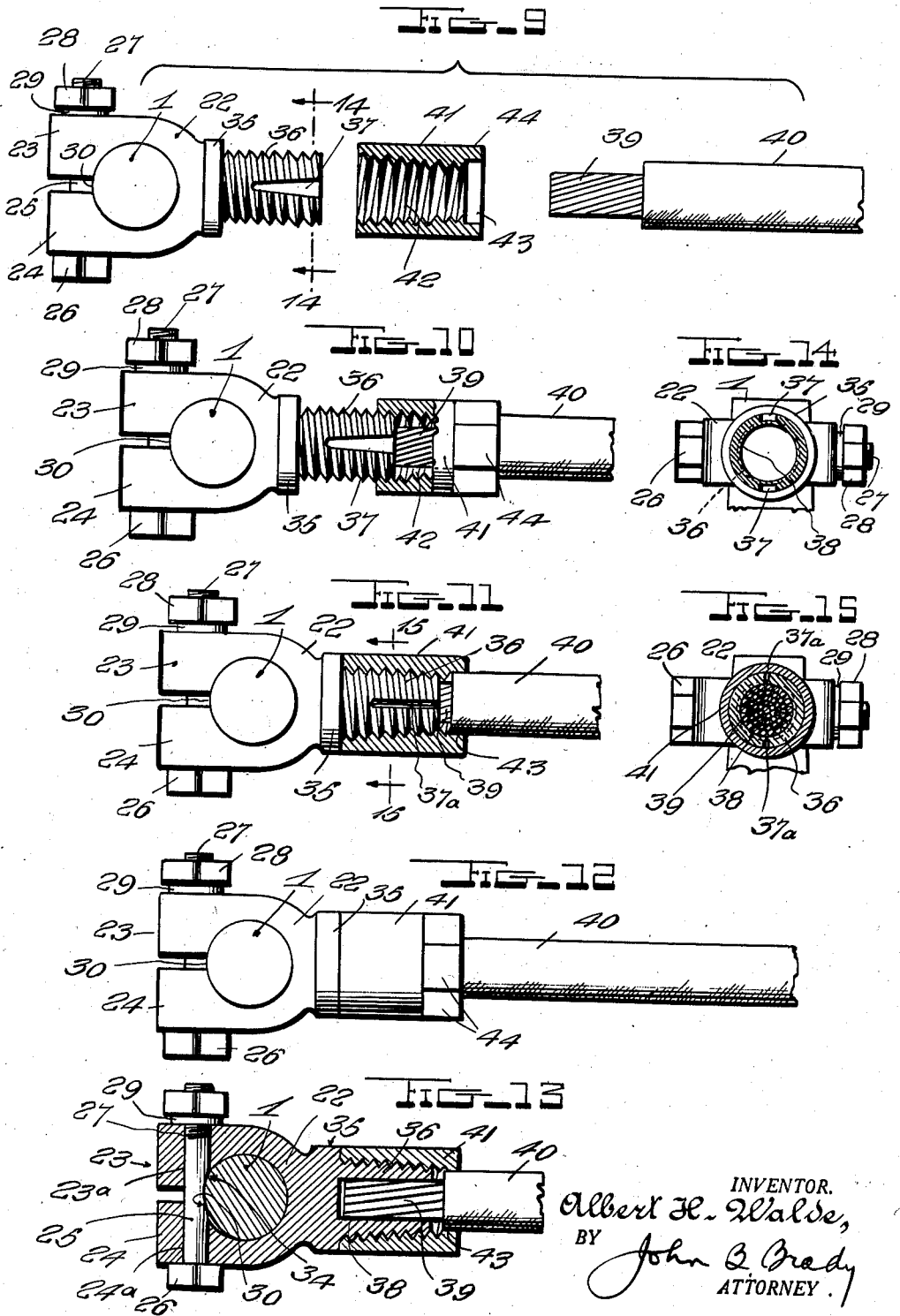

2,111,712

UNITED STATES PATENT OFFICE 2,111,712

BATTERY TERMINAL

Albert H. Walde, Roxborough, Pa., assignor, by direct and mesne assignments, of one-third to Arnold Berman, Philadelphia, Pa., and one-third to Carrie E. Hohl, Upper Darby, Philadelphia, Pa.

Application June 15, 1936, Serial No. 85,363

1 Claim. (Cl. 173—259)

My invention relates broadly to storage batteries and more particularly to an improved construction of non-corrosive solderless terminal for storage batteries and cables associated therewith.

One of the objects of my invention is to provide a construction of non-corrosive solderless terminal for storage batteries and cables in which the securing portions of the terminal are formed from a composition material having such inherent resiliency that a firm interconnection between the storage battery post and the associated connecting cable may be assured.

Another object of my invention is to provide a construction of non-corrosive solderless battery terminal and cable connector which may be readily cast from composition material inexpensively on a quantity production basis and wherein the securing portions of the terminal have such inherent resiliency as will insure an intimate connection between the cable and the storage battery post.

Still another object of my invention is to provide a construction of terminal for storage battery post which employs a combined wedging and squeezing action for facilitating the installation and removal of the terminal with respect to the post.

A further object of my invention is to provide a construction of storage battery terminal in which a pair of inherently resilient jaw members embrace opposite sides of a storage battery post and are drawn together with respect to the storage battery post by means of a bolt member having a portion thereof substantially chordal with respect to the storage battery post whereby the force tending to draw the jaws together is aligned relatively close to the central axis of the post.

A still further object of my invention is to provide a construction of solderless terminal for storage batteries in which a pair of jaws embrace opposite sides of a storage battery post with a bolt extending through the jaws and wherein the bolt has one side thereof recessed to embrace a portion of the cylindrical surface of the storage battery post and establish a wedging action with respect thereto and at the same time provide means for securing a squeezing action between the jaws and the post to facilitate installation and removal of the terminal from the post.

Still another object of my invention is to provide means for forming an intimate connection between a cable and a storage battery terminal by directly casting the composition material of the terminal around the end of the cable.

A further object of my invention is to provide a construction of non-corrosive storage battery terminal having a threaded portion recessed to receive the end of a cable and coacting with a threaded sleeve telescopically disposed about the end of the cable and in which the wall of the threaded portion of the terminal is reduced in section at selected positions for allowing sufficient displacement of the metal of the threaded wall portion of the terminal to form an intimate contact with the end of the cable thereby permitting the use of cables of various sizes.

A still further object of my invention is to provide a construction of storage battery terminal which may be readily cast on a quantity production basis from a composition formed from 9% antimony; 83% lead; 2% copper; 5% tin; and approximately ½ to 1% silicon, for providing a non-corrosive material for a solderless terminal for batteries and cables.

Other and further objects of my invention reside in a construction of storage battery terminal employing combined squeezing and wedging operating means for securing the terminal with respect to a storage battery post as set forth more fully in the specification hereinafter following, by reference to the accompanying drawings, in which:

Figure 1 is a plan view of the terminal of my invention about to be tightened upon the storage battery post; Fig. 2 shows the terminal of my invention tightened in operating position; Fig. 3 is an enlarged fragmentary horizontal sectional view with parts shown in elevation and illustrating the terminal of my invention about to be tightened upon a storage battery post; Fig. 4 is a cross-sectional view through the terminal of my invention with the binding bolt tightened in operating position and showing the manner in which the storage battery post is squeezed by the terminal and wedged by the bolt; Fig. 5 is a longitudinal cross-sectional view through the terminal illustrating one manner in which the cable is applied to the terminal; Fig. 6 is a plan view of the binding bolt used in the terminal of my invention; Fig. 7 is a side elevational view of the binding bolt used in association with the terminal of my invention; Fig. 8 is a theoretical diagram illustrating the forces which are involved in securing the bolt against one side of the storage battery post; Fig. 9 is a view illustrating the several parts of a modified form of storage battery terminal embodying my invention in which the cable is clamped with respect to the terminal; Fig. 10 is a view showing the cable about to be assembled with respect to the terminal; Fig. 11 is a cross-sectional view illustrating the cable moved to connecting position with respect to the terminal and illustrating the terminal collapsed upon the end of the cable; Fig. 12 is a plan view showing the terminal and cable in connected position; Fig. 13 is a horizontal longitudinal sectional view through the modified form of terminal of my invention; Fig. 14 is a vertical sectional view on line 14—14 of Fig. 9 through the connecting sleeve of the terminal of my invention before the sleeve is collapsed upon the cable in effecting the connection between the cable and the terminal; and Fig. 15 is a vertical sectional view on line 15—15 of Fig. 11 showing the terminal collapsed upon the cable in accordance with the modified form of terminal of my invention.

My invention is directed to a construction of non-corrosive solderless terminal for storage batteries and cables in which I employ a composition material which may be readily cast to form the storage battery terminal to provide a non-corrosive solderless terminal of such inherent resiliency that the terminal may be readily applied to or removed from storage battery posts. I wholly depart from all constructions requiring the employment of a metallic insert or external armor member for imparting resiliency to the jaws of the terminal. Such metallic inserts or external armor devices introduce complications in manufacture and increase manufacturing costs to such extent as to render such terminals so expensive as to be impractical for general adoption.

After extended research and development, I have discovered that resiliency may be imparted to a non-corrosive composition for a solderless storage battery terminal and cable connector by employing a composition of 9% antimony; 83% lead; 2% copper; 5% tin; and approximately ½ to 1% silicon. I introduce the copper and tin for imparting pliability and inherent resiliency to the terminal. The lead forms the non-corrosive body of the terminal which is also one of the properties imparted to the composition by the use of tin. The antimony serves to regulate the brittleness of the composition and the silicon serves to determine the hardness of the composition. By reason of the composition employed in the terminal of my invention, I am enabled to form the terminal into a pair of coacting jaws which embrace opposite sides of a storage battery post with a sufficient gap between the ends of the jaws to allow the terminal to meet conditions with respect to variations in size of the storage battery post. The construction of my terminal is such that I am enabled to conductively cover substantially the entire periphery of the storage battery post. Of the 360° of circumference of the storage battery post, the terminal of my invention embraces substantially the entire periphery with the exception of approximately 2°. The jaws are apertured in alignment with one side of the storage battery post. The bolt member which passes through the aligned apertures is recessed in one side thereof so that the bolt extends substantially chordal to the storage battery post. The bolt is recessed at one side thereby enabling the bolt to substantially hug a peripheral cylindrical portion of the post. The recess in the bolt is formed on substantially a compound curve providing a shoulder on the bolt adapted to wedge against one side of the storage battery post and form an intimate electrical connection therewith. The nut which engages the screw-threaded end of the bolt is adapted to force the jaws together by a squeezing action so that intimate electrical connection between the terminal and the post is assured by the conjoint squeezing and wedging action brought about by the combined operation of the bolt with respect to the post and the securing means on the bolt operating with respect to the jaws of the terminal.

By reason of the use of non-corrosive material for the battery terminal, removal of the terminal from the storage battery post may be effected by loosening the nut on the securing bolt and tapping the bolt whereby the jaws are released and spread sufficiently to allow removal of the terminal from the post. Moreover, the end of the bolt may be tapped sufficiently to impart a force to the storage battery post through the recessed portion of the bolt for facilitating removal of the terminal from the post. I may insert the securing bolt in either position in the ends of the jaws as the bolt is wholly reversible. The bolt is positioned through the jaws before the terminal is placed on the storage battery post. Heretofore, jaw type terminals have required the insertion of the bolt in one direction only or have required a special fitting to allow the bolt to be inserted in the reversed position.

In order to insure an intimate connection between the end of the cable and the terminal, I cast the terminal directly around the end of the cable. The material of the terminal flows around the wire strands of the cable forming an intimate and solid electrical connection therewith. In instances where it is undesirable to cast the material of the terminal about the end of the cable, I provide a frusto-conical shaped end portion on the terminal. The frusto-conical portion is screw-threaded and is reduced in section at diametrically opposite positions thereof. The frusto-conical end portion of the terminal is adapted to receive the end of the cable and a coacting screw-threaded sleeve telescopically disposed over the end of the cable operates to engage the screw-threaded portion of the terminal and force the walls thereof into intimate engagement with the end of the cable thereby insuring good electrical connection between the cable and the terminal.

Referring to the drawings in detail, reference character 1 designates the storage battery post to which the terminal 2 of my invention is applied. The terminal 2 includes a pair of coacting clamping jaws 3 and 4 which are each provided with a substantially semicircular recessed face adapted to grip the side cylindrical wall of the storage battery post 1. The jaws 3 and 4 are each provided with laterally extending aligned apertures 3a and 4a respectively to receive the bolt member 5. The bolt member 5 contains a head 6 and is screw-threaded at the end thereof as indicated at 7. Screw threads 7 are adapted to receive the nut 8 which is screw-threaded thereover. I provide a metallic washer 9 which fits between the nut 8 and the exterior face of the jaw shown at 4.

The bolt member 5 is provided with a recess in one side thereof as indicated at 10. The recess 10 is formed from a compound curve. The central portion of the recess 10 is formed on a radius as indicated at 11 in Fig. 6. Opposite ends of the curved recess 10 are formed on radii indicated at 13 in Fig. 6 to provide the curved portion 12 of the recess at each end of the recess shown at 10. The recessed portion 10 of the bolt member 5 is shaped generally to correspond with the curvature of the cylindrical wall of the storage battery post 1. In assembling the terminal on the storage battery post 1, the jaws 3 and 4 are normally spread as indicated in Fig. 3 with the bolt member 5 extending through the jaws and having the recess 10 aligned to form substantially a continuation of the cylindrical internal wall of the terminal 2. The terminal 2 may be slipped over the storage battery post with the bolt member 5 relatively loose in the jaws 3 and 4. The terminal is then tightened upon the storage battery post in the manner illustrated in Fig. 4 in following out the theory illustrated in Fig. 8. As the nut 8 is tightened, the jaws 3 and 4 are drawn together to squeeze opposite sides of the storage battery post 1. The bolt member 5 has the compound curves 10 and 12 thereon continuously in contact with the cylindrical side wall of the storage battery post 1 and as the bolt member is tightened in the terminal, the compound curve 12 nearest the end of the bolt having head 6 thereon tends to displace a portion of the side wall of bolt 1 or upset the material of the post in such a way as to form a wedge connection which insures a very substantial electrical contact between the terminal and the storage battery post. Fig. 4 illustrates the distorted shape of the storage battery post 1 due to the wedging action of the bolt member 5. It will be clear by reference to Fig. 8 that forces are brought into play which tend to distort the material of the storage battery post as indicated by the arrows. The terminal of my invention is molded from a non-corrosive composition formed from 9% antimony; 83% lead; 2% copper; 5% tin; and approximately ½ to 1% silicon. The terminal is tightly clamped to the storage battery post 1. In order to provide for the ready insertion and removal of the terminal from the storage battery post, the semicylindrical recesses 3a and 4a in the jaws 3 and 4 are tapered to correspond with the shape of the storage battery post 1. The end of the cable formed of stranded conductors illustrated at 17 is directly molded into the material of the terminal 2. The end of the terminal 2 is shown provided with an end flange 16. The cable 17 has an insulated sheath 18 thereover, the end of which enters a recess 19 in the end of the terminal as illustrated in Fig. 5. Because of the fact that the end of the cable is molded into the material of the terminal 2, a very good electrical connection and intimate contact between the stranded ends of the cable and the material of the terminal 2 is secured.

The modified form of terminal of my invention is illustrated in Figs. 9-15. The terminal has a body structure 22 molded from the same composition material heretofore described. The body structure 22 includes a pair of coacting jaws 23 and 24 having semicylindrical apertures or recesses 23a and 24a respectively. The recesses 23a and 24a coact with the opposite sides of the storage battery post 1. The bolt member which extends through the coacting jaws 23 and 24 is similar to the bolt member heretofore described and has been illustrated in the modified form by reference character 25. The bolt member 25 includes a head 26 and is screw-threaded at the end as shown at 27. The nut 28 engages the screw threads 27. A metallic washer 29 is disposed between nut 28 and the side of the jaw 23. The bolt member 25 contains a curved recess shown at 30 corresponding to the compound curved recess heretofore described. The bolt member passes through the jaws 23 and 24 and tends to squeeze the jaws against opposite sides of the storage battery post 1 and at the same time provides a wedging action against the storage battery post 1 which is upset or distorted as indicated at 34 in Fig. 13 corresponding to the manner of distortion or displacement illustrated in Fig. 4.

The terminal 22 is provided with an annular shoulder 35. There is a frusto-conical shaped molded screw terminus on terminal 22 shown at 36. The frusto-conical shaped screw-threaded terminus is molded from the material of which the terminal 22 is constructed and is integral with the material forming jaws 23 and 24. The cylindrical wall of the frusto-conical terminus 36 is provided with diametrically opposite longitudinally extending portions which are reduced in thickness as indicated at 37. The thinner walls of the frusto-conical portion forming the terminus are substantially tapered and are relatively narrow at the position nearest the annular shoulder 35 and are wider adjacent the end of the screw-threaded terminus. The reduced section of the screw-threaded terminus at 37 is weaker than the walls of the terminus at 36 so that the frusto-conical terminus may be collapsed upon the wires of the cable indicated at 39 for forming a good electrical connection with the wires of the cable. The cable is shown as having the stranded ends 39 covered by insulation material forming the cover of the cable as shown at 40.

The frusto-conical terminus 36 has a cylindrical internal bore 38 which receives the stranded ends 39 of the cable. I provide a cylindrical sleeve 41 having tapered internal screw threads 42 therein shaped to engage the screw threads 36 of the frusto-conical terminus. The sleeve 41 having the tapered internal screw threads 42 therein is adapted to be screwed over the screw-threaded terminus 36 when the end of the cable 39 is in position within the cylindrical bore 38. That is to say, the end 39 of the cable is first pushed into the cylindrical bore 38 to the limit of the distance allowed by the cylindrical recess 43 in the sleeve 42 which serves as a covering or protector for the end of the insulation 40 over the cable. The sleeve 41 is screwed over the screw-threaded terminus 36 by means of a tool engaging the faces 44 on the end of the sleeve 41. I have shown in Figs. 10 and 14 the position of the reduced longitudinally extending wall portion 37 in the terminus before the sleeve 41 is screwed into final position. When, however, the sleeve 41 is screwed into final position, the wall sections 37 are collapsed as represented in Figs. 11 and 15 at 37a, whereby the frusto-conical shaped terminus 36 tightly engages the end of the cable 39, thereby insuring a substantial electrical connection between the terminus and the cable.

The final arrangement of the connection between the end of the cable and the terminal is illustrated in Fig. 13 in which the standard wires 39 of the cable are tightly gripped within the bore 38 by the collapsing of the longitudinally extending walls 37 in the terminus 36 under control of the sleeve 41. The character of the electrical connection can be fully understood by reference to Fig. 15 wherein it will be seen that the strands of the cable 37 are tightly compressed within the bore 38 thereby insuring good electrical connection.

It will be observed that apertures 3a and 4a in jaws 3 and 4 and apertures 23a and 24a in jaws 23 and 24 are aligned in the respective jaws in such position that the bolt member 5 or 25 in each case is substantially chordal of the storage battery post. A tangent drawn to the storage battery post passes through the bolt member intermediate one side and the central axis of the bolt member.

I have found in the past that terminals providing a poor electrical connection with the storage battery post provide a source of high resistance thereby introducing a loss in the storage battery circuit and causing overheating of the terminal and ultimate destruction thereof. Poor electrical connection becomes much worse as corrosion continues so that I have developed my present invention with the disadvantages of earlier types of terminals in mind. The present construction of terminal insures an intimate connection between the terminal and the storage battery post. There cannot be poor electrical conductivity between the terminal and the storage battery post in the construction of my invention. Substantial electrical connection between the end of the cable and the terminal is insured by virtue of the molding of the end of the cable into the terminal or the mechanical interconnection between the end of the cable and the terminal by the collapsing of the wire structure of the frusto-conical terminus upon the strands of the cable as hereinbefore described.

I have found the composition which I have described herein highly advantageous because of the inherent resilient properties imparted to the jaws of the terminal. It is unnecessary to apply a metallic insert of spring material as has heretofore been suggested. Such inserts increase the cost of the terminal and introduce complications wholly unnecessary in the manufacturing process of the terminal of my invention. I have found the construction of terminal as set forth herein highly advantageous in manufacture and production and efficient in operation. I realize, however, that modifications of my construction may be made and I intend that no limitations be placed upon my invention other than may be imposed by the scope of the appended claim.

What I claim as new and desire to secure by Letters Patent of the United States is as follows:

A storage battery terminal comprising a body structure having a pair of coacting jaws engageable with the connecting post of a storage battery and having aligned apertures therein, a bolt member having a smooth shank screw threaded adjacent the end thereof and projecting through said aligned apertures and having a head portion integral therewith and bearing on one of the said jaws, a nut engaging the screw threaded end of said bolt member and bearing on the other of said jaws for squeezing said jaws into engagement with opposite sides of said connecting post, means on said bolt for establishing wedging connection with the side of said connecting post, said means comprising a recess in the smooth shank of said bolt member formed on a compound curve substantially corresponding with the curvature of the connecting post and having rounded shoulders forming abutments with said connecting post.

ALBERT H. WALDE.